United States Patent [19]

Douglas

[11] Patent Number: 5,226,578
[45] Date of Patent: Jul. 13, 1993

[54] METHOD OF MANUFACTURING AN ARTICLE, A METHOD OF DIFFUSION BONDING AND A VACUUM CHAMBER

[75] Inventor: Joseph Douglas, Derby, England

[73] Assignee: Rolls-Royce PLC, London, England

[21] Appl. No.: 935,250

[22] Filed: Aug. 27, 1992

[30] Foreign Application Priority Data

Oct. 29, 1991 [GB] United Kingdom ............... 9122874

[51] Int. Cl.$^5$ .............................................. B23K 31/00
[52] U.S. Cl. ..................................... 228/157; 228/118; 228/193
[58] Field of Search ............... 228/118, 157, 193, 214, 228/242

[56] References Cited

U.S. PATENT DOCUMENTS

| | | | |
|---|---|---|---|
| 5,024,368 | 6/1991 | Bottomley et al. | 228/118 |
| 5,069,383 | 12/1991 | Cooper et al. | 228/157 |
| 5,118,026 | 6/1992 | Stacher | 228/157 |

FOREIGN PATENT DOCUMENTS 0414435  2/1991 European Pat. Off.
0460872 12/1991 European Pat. Off.

Primary Examiner—Samuel M. Heinrich
Attorney, Agent, or Firm—Cushman, Darby & Cushman

[57] ABSTRACT

A stack of titanium sheets are placed between a pair of pressurisable chambers in a vacuum chamber. One of the mating surfaces of each pair of mating surfaces has had a stop off material applied in a desired pattern to prevent diffusion bonding. A pump evacuates the vacuum chamber and heaters heat the stack to evaporate volatile binders from the stop off. When all the binder has been removed the stack is heated and the pressure in the pressurisable chambers is increased to cause a pair of resilient members to apply pressure on the stack to diffusion bond the sheets together. The volatile binder is removed quickly and oxidation of the titanium is prevented during baking out of the binder. The integral structure is then heated and internally pressurised to superplastically form one of the sheets to produce an article of predetermined shape. No welding of the sheets before bonding is required.

12 Claims, 2 Drawing Sheets

METHOD OF MANUFACTURING AN ARTICLE, A METHOD OF DIFFUSION BONDING AND A VACUUM CHAMBER

The present invention relates to a method of manufacturing an article by superplastic forming and diffusion bonding.

It is known to manufacture metallic articles by superplastic forming and diffusion bonding metal workpieces. These metal workpieces include elementary metal, metal alloy and metal matrix composites. At least one of the metal workpieces must be capable of superplastic extensions.

In one known process the surfaces of the workpieces to be joined are cleaned, and at least one surface of one or more of the workpieces is coated in preselected areas with a material to prevent diffusion bonding. The workpieces are arranged in a stack and the edges of the workpieces are welded together, except where a pipe is welded to the workpieces, to form an assembly. The pipe enables a vacuum, or inert gas pressure to be applied tot he interior of the assembly. The assembly is placed in an autoclave and heated so as to "bake out" the binder from the material to prevent diffusion bonding. The assembly is then evacuated and the pipe is sealed. The sealed assembly is then placed in a pressure vessel and is heated and pressed to diffusion bond the workpieces together to form an integral structure. Diffusion bonding occurs when two mating surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the workpieces to be superplastically formed to cause at least one of the integral structure to produce an article matching the shape of the dies.

In the known method the welding of the pipe, for subsequently removing vaporised binder and for evacuating the assembly, to the workpieces is time consuming. The use of the pipe for removing vaporised binder from the assembly is also time consuming. Furthermore the assembly contains air when it is heated to vaporise the binder and this results in oxidation of the surfaces of the workpieces which are subsequently to be diffusion bonded.

Out UK patent application 9208369.0 filed on Apr. 16, 1992 which claims priority from our prior UK patent application 9111954.5 filed on Jun. 4, 1991, incorporated herein by reference, disclosed a novel method of manufacturing an article by superplastic forming and diffusion bonding which overcame the above problems. In that patent application, it is disclosed that the stack of workpieces is placed in a vacuum chamber, and the vacuum chamber is evacuated. The stack is heated while it is within the vacuum chamber to evaporate the volatile binder from the stop off material, while the vacuum chamber is continuously evacuated to remove the volatile binder from between the workpieces and the vacuum chamber. The edges of the workpieces are welded together while the stack is within the vacuum chamber to form a sealed assembly. The sealed assembly is then diffusion bonded to form an integral structure and the integral structure is superplastically formed.

The present invention seeks to provide a novel method of manufacturing an article by superplastic forming and diffusion bonding which also does not have the above mentioned disadvantages and which is simpler than the method disclosed in our prior UK patent application mentioned above.

Accordingly the present invention provides a method of manufacturing an article by superplastic forming and diffusion bonding at least two metal workpieces comprising the steps of (a) applying a stop off material to prevent diffusion bonding to preselected areas of at least one of the surfaces of at least one of the at least two metal workpieces, (b) assembling the at least two workpieces into a stack relative to each other so that the surfaces are in mating abutment, (c) placing the stack in pressing means positioned within a vacuum chamber, (d) evacuating the vacuum chamber, (e) minimising the pressure applied across the thickness of the at least two workpieces, by the pressing means, to allow the flow of volatile binders and gases from between the at least two workpieces into the vacuum chamber, (f) heating the stack while it is within the vacuum chamber to evaporate volatile binder from the stop off material, while continuously evacuating the vacuum chamber to remove the volatile binder form between the at least two workpieces and the vacuum chamber, (g) applying heat and increasing the pressure applied across the thickness of the at least two workpieces, by the pressing means, to diffusion bond the at least two workpieces together in areas other than the preselected areas to form an integral structure, (h) removing the integral structure form the vacuum chamber, (i) heating the integral structure and internally pressurising it to cause the preselected areas of at least one of the workpieces to be superplastically formed to produce an article of pre-determined shape.

Preferably the stack is placed between a first selective pressing means and a second selective pressing means in the vacuum chamber, the pressure applied across the thickness of the at least two workpieces is minimised by minimising the pressure applied by the first and second selective pressing means, the pressure applied across the thickness of the at least two workpieces is increased by increasing the pressure applied by the first and second selective pressing means.

Preferably the first selective pressing means is a first selectively pressurisable chamber and the second selective pressing means is a second selectively pressurisable chamber.

Preferably the stack is heated to a temperature between 250° C. and 350° to evaporate the volatile binder from the stop off material.

Preferably where the workpieces are made of a titanium alloy, the workpieces are heated to a temperature equal to or greater than 850° C. and the pressure applied is equal to or greater than $20 \times 10^5$ Nm$^{-2}$ to diffusion bond the workpieces together to form an integral structure.

Preferably the workpieces are heated to a temperature between 900° C. and 950° C. and the pressure applied is between $20 \times 10^5$ Nm$^{-2}$ and $30 \times 10^5$ Nm$^{-2}$.

Preferably the integral structure is heated to a temperature equal to or greater than 850° C. to superplastically form the integral structure.

Preferably the integral structure is heated to a temperature between 900° C. and 950° C.

Preferably during the assembling of the at least two workpieces into a stack a pipe is arranged to extend from the stack, one end of the pipe is adjacent a preselected area of at least one of the surfaces of at least one of the at least two metal workpieces.

The present invention also provides a method of diffusion bonding together at least two metal workpieces comprising the steps of (a) assembling the at least two metal workpieces into a stack relative to each other so that the surfaces of the metal workpieces are in mating abutment, (b) placing the stack between a first selectively pressurisable chamber and a second selectively pressurisable chamber in a vacuum chamber, (c) evacuating the vacuum chamber, (d) applying heat and increasing the pressure in the first and second pressurisable chambers to apply pressure across the thickness of the at least two workpieces to diffusion bond the workpieces together.

Preferably where the workpieces are made of titanium alloy, the workpieces are heated to a temperature equal to or greater than 850° C. and the pressure applied is equal to or greater than $20 \times 10^5$ Nm$^{-2}$ to diffusion bond the workpieces together to form an integral structure.

Preferably the workpieces are heated to a temperature between 900° C. and 950° C. and the pressure applied is between $20 \times 10^5$ Nm$^{-2}$ and $30 \times 10^5$ Nm$^{-2}$.

The present invention also provides a vacuum chamber for use in processing at least two metal workpieces for diffusion bonding comprising pump means arranged to evacuate the vacuum chamber, heater means arranged to heat a stack of at least two metal workpieces placed int eh vacuum chamber, a first pressure containing member and a first resilient member define a first selectively pressurisable chamber, a second pressure containing member and a second resilient member define a second selectively pressurisable chamber, the first and second resilient members are spaced from, and confront, each other to allow a stack of at least two metal workpieces to be positioned between the first and second resilient members, means to selectively pressurise the first and second chambers to cause the first and second resilient members to apply a diffusion bonding pressure on the stack to diffusion bond the mating surfaces of the metal workpieces.

Preferably the means to selectively pressurise the first and second chambers is arranged to minimise the pressure in the first and second chambers such that the first and second resilient members press the stack of workpieces together with minimum pressure to allow the pump to remove volatile binders, evaporated by the heater means, from between the at least two metal workpieces and the vacuum chamber.

Preferably the first pressure containing member has ribs to maximise rigidity.

Preferably the ribs extend into the first pressurisable chamber.

Preferably the second pressure containing member has ribs to increase rigidity.

Preferably the ribs extend into the second pressurisable chamber.

Preferably the volume of the first pressurisable chamber is minimised to minimise damage to the vacuum chamber in the even of a leak from the said chamber.

Preferably the volume of the second pressurisable chamber is minimised to minimise damage to the vacuum chamber in the event of a leak from the said chamber.

Preferably the first or second resilient member has a coating to prevent adhesion between the said first or second resilient member and any stack of at least two metal workpieces.

Preferably the first or second resilient member is metallic.

The present invention also provides a vacuum chamber for use in processing at least two metal workpieces for diffusion bonding comprising pump means arranged to evacuate the vacuum chamber, heater means arranged to heat a stack of at least two metal workpieces placed in the vacuum chamber, a pressure containing member and resilient member define a selectively pressurisable chamber, means to selectively pressurise the pressurisable chamber to cause the resilient member to apply a diffusion bonding pressure on the stack to diffusion bond the mating surfaces of the metal workpieces.

The present invention will be more fully described by way of example with reference to the accompanying drawings, in which.

Figure 3:
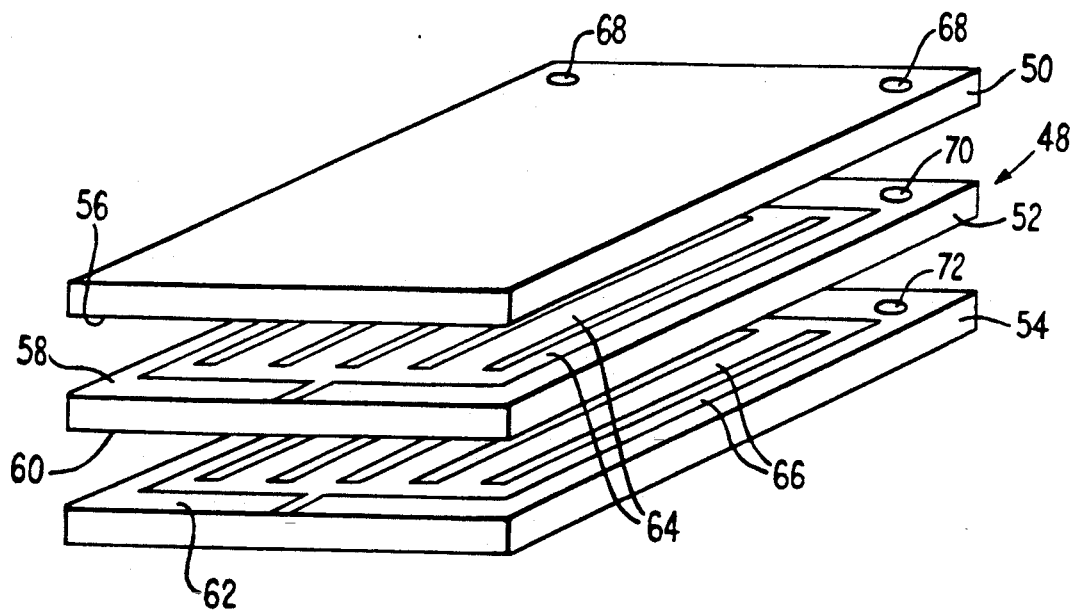
FIG. 3 illustrates an exploded view of a stack of workpieces which are superplastically formed and diffusion bonded to form an article according to the present invention.

In FIG. 3, three sheets of titanium allow 50, 52 and 54 are assembled into a stack 48.

Prior to assembling the sheets 50, 52 and 54 into the stack 48, the mating surfaces 56, 58, 60 and 62 of the sheets 50, 52 and 54 are prepared for diffusion bonding by chemical cleaning. One of the mating surfaces 56 and 58 in this example, mating surface 58, has had a stop off material applied, and one of the mating surfaces 60 and 62, in this example mating surface 62, has had a stop off material applied. The stop off may comprise powdered yttria in a binder and binder e.g. the stop off known as "stopyt 62A" which is sold by an American company named GTE Service Corporation of 100 Endicott Street, Danvers, MA01923, USA. Other suitable stop off materials may be used.

The stop off material is applied in desired patterns 64 and 66, shown as the shaded areas in FIG. 3, by the silk screen printing process in this example, but other suitable methods may be used. The desired patterns 64 and 66 of stop off material prevent diffusion bonding between preselected areas of the sheets 50, 52 and 54. In this example the stop off is applied in straight lines, but it may be applied as dots or other suitable patterns depending on the particular article to be manufactured. The three sheets of titanium alloy 50, 52 and 54 are then assembled into the stack 48. The sheet 50 has a pair of dowel holes 68 which are axially aligned with corresponding dowel holes 70 in sheet 52 and with corresponding dowel holes 72 in sheet 54 to ensure the correct positional relationship between the three sheets 50, 52 and 54 in the stack 48. The sheets 50, 52 and 54 are maintained in this positional relationship by a pair of dowels (not shown) which are inserted in the axially aligned dowel holes 68, 70 and 72.

The stack 48 is then placed in a vacuum chamber, which will be more fully described later in this specification. The stack 48 is placed between a pair of pressurisable chambers positioned within the vacuum chamber. The vacuum chamber is evacuated and the pressure in the pressurisable chambers is reduced, preferably they are evacuated, and then the stack 48 is heated to a temperature between 250° C. and 350° C. to evaporate the binder from the stop off material and which has enabled the stop off to be spread through the silk screen. The pressure in the pressurisable chambers is reduced, preferably to a vacuum, before the stack is heated so that the pressurisable chambers do not apply a load on the stack 48 during the baking out of the binder. During the baking out of the binder, the vacuum chamber is continuously evacuated to remove the binder from between the sheets and from the vacuum chamber. The volatile binders are allowed to be removed from between the sheets, throughout the full periphery of the stack, along all edges of the sheets, because the pressurisable chambers are not clamping the edges of the sheets together. After the binder has been removed, which is determined either by monitoring the binder levels in the gas extracted from the vacuum chamber or by maintaining the vacuum chamber at the temperature between 250° C. and 350° C. for a predetermined time the stack 48 is diffusion bonded together to produce an integral structure.

The heating of the un-welded/un-bonded stack of sheets in the continuously evacuated vacuum chamber enables the volatile binders to be removed from the stack throughout the full periphery of the stack, along all edges of the sheets. This allows the volatile binders to be removed much quicker than in the known prior art and as quickly as in our UK patent application GB9111954.5 and GB9208369.0. This too dispenses with the need to fit a pipe to the stack and hence there is a time saving. Furthermore by heating the un-welded-/un-bonded stack of sheets int eh continuously evacuated vacuum chamber, there is no air present in the vacuum chamber to oxidise the surfaces of the sheets.

The temperature in the vacuum chamber is increased such that the stack of sheets is heated to a temperature greater than 850° C. Preferably the stack of sheets is heated to a temperature between 900° C. and 950° C. The pressure in the pair of pressurisable chambers is increased such that the pressurisable chambers apply a pressure greater than 20 atmospheres, 294 lbs per square inch ($20.26 \times 10^5 Nm^{-2}$). Preferably the pressure applied by the pressurisable chambers is between 294 lbs per square inch ($20.26 \times 10^5 Nm^{-2}$) and 441 lbs per square inch ($30.39 \times 10^5 Nm^{-2}$). The temperature and pressure is held constant for a predetermined time. For example if the stack of sheets is heated to 925° C. and the pressure applied by the pressurisable chambers is 300 lbs per square inch, the temperature and pressure are held constant for 2 hours. The temperature and pressure are then reduced to ambient, diffusion bonding having been achieved and the stack of sheets, which is then an integral structure, is removed from the vacuum chamber.

A pipe is fitted to the integral structure, and argon is introduced into the area, within the integral structure, containing the stop off in order to break the adhesive grip which the diffusion bonding pressure has brought about. The argon is carefully introduced to those areas which contain the stop off, and the argon seeps through the stop off and eventually reaches the opposing end of the integral structure. The argon may initially be caused to travel between one pair of workpieces and on reaching the opposite end return to the inlet end between another pair of workpieces. In any event, the argon must travel the whole length of the interior of the integral structure such as to break the adhesive grip between the stop off and the sheets brought about during the diffusion bonding step.

This step is carried out at room temperature because the metal is elastic at room temperature and the minimal extension which occurs does not go beyond the elastic limit. Consequently, the integral structure regains it s shape when pressure is removed at the end of the stop. If this step is attempted whilst the integral structure is at the common diffusion bonding and superplastic forming temperature, there is a serious risk of progressive plastic deformation lengthwise of the integral structure, rather than simultaneous deformation over the whole structure. In such circumstances, rupturing of the integral structure frequently occurs.

The integral structure is placed between appropriately shaped split dies, and the whole is positioned within an autoclave which is then evacuated so as to avoid contamination of the titanium integral structure.

The dies and integral structure are again heated to a temperature greater than 850° C., preferably between 900° C. and 950° C. In this example, the dies and integral structure are heated to 925° C. Argon is introduced into the interior of the integral structure between the adjacent sheets, so as to force the sheets apart in the areas which have stop off and to force the parted portions of the outer sheets into the respective dies.

The magnitude of the movement of at least one of the sheets during deformation, is such as to require superplastic extension to occur. The term "superplastic" is a standard term in the metal forming art and will not be described herein.

In order to achieve superplastic forming without rupturing the thinning metal the argon is introduced in a series of constant volume pulses, at a pre-calculated rate which will achieve a desired strain rate, as is taught at PP 615-623 in the book "The Science, Technology and Applications of Titanium" edited by R I Jaffe and N E Promisel, published by Pergamon Press in 1970, which is hereby incorporated by reference. The method ensures that the metal is subjected to that strain rate which will achieve the maximum permissible speed of extension at any given point in the procedure.

On completion of superplastic forming, the inert argon atmosphere and the gas pressure within the integral structure is maintained whilst the structure is cooled to room temperature. The integral structure is then removed from the autoclave and the piping removed. This integral structure may be the finished article, or some final machining of the integral structure may be required to produce the finished article.

It may be possible to arrange a pipe in the stack during the stacking of the metal workpieces such that the pipe extends from the stack, and one end of the pipe is adjacent to the preselected area of one of the surfaces, of one of the metal workpieces, which prevents diffusion bonding. During the diffusion bonding step, the pipe is diffusion bonded into the integral structure and the pipe is subsequently used to introduce argon into the integral structure to break the adhesive grip, and subsequently to superplastically form the integral structure.

The advantage of this method over the method disclosed in our prior patent application GB9111954.5 and GB9208369.0 is that the requirement for welding the edges of the stack of sheets to form a sealed assembly before diffusion bonding is obviated, and this reduces the processing time. It is also not necessary to move the stack of workpieces between the baking out step and the diffusion bonding steps, and hence there is no possibility of damage to the stop off whilst it is brittle.

Figure 1:
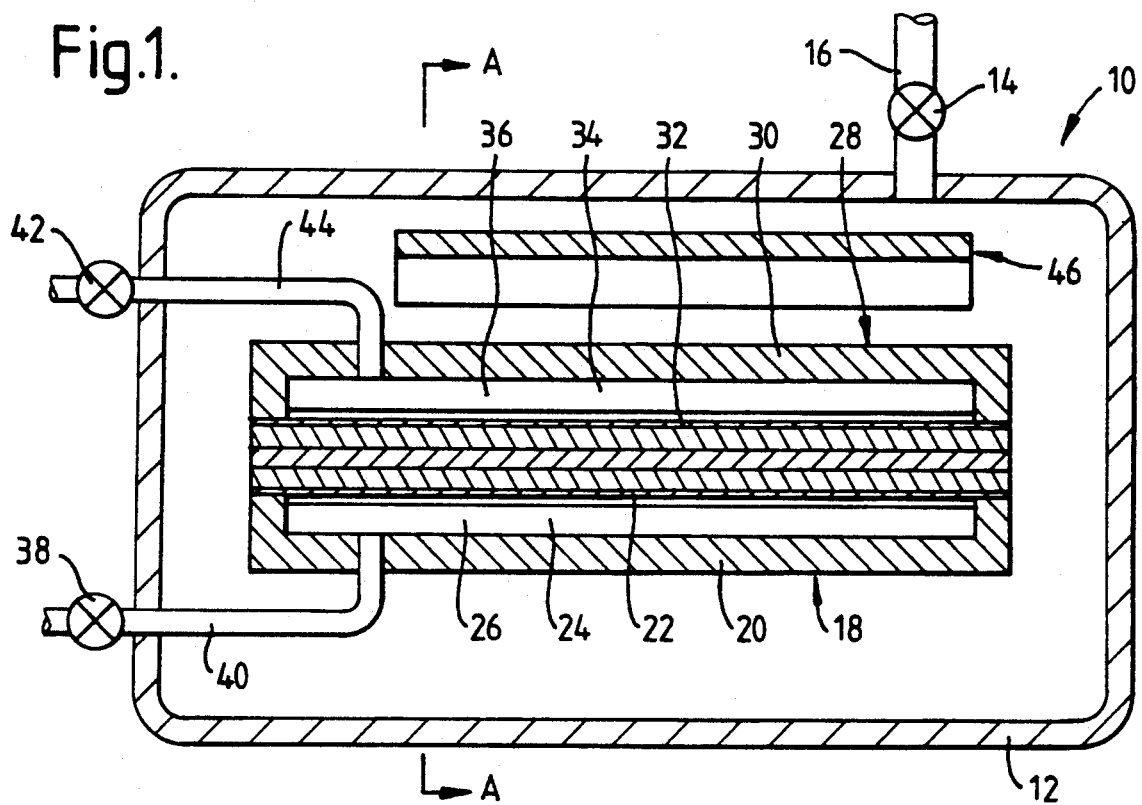
FIG. 1 is a sectional view through a vacuum chamber for use in processing metal workpieces for superplastic forming and diffusion bonding according to the present invention.
Figure 2:
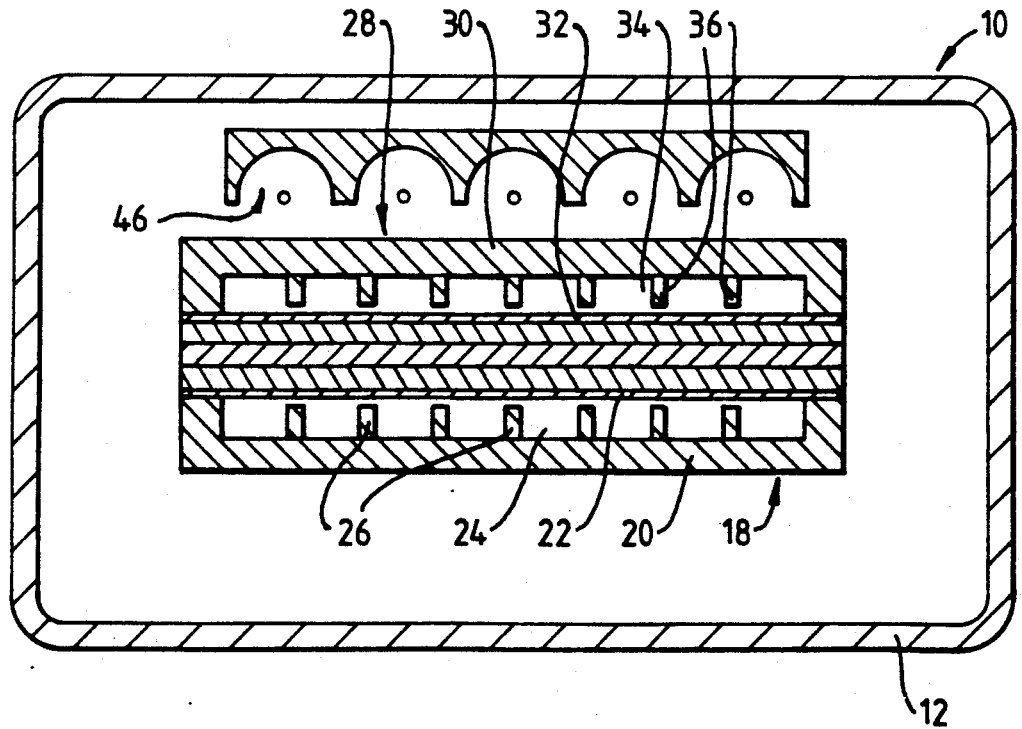
FIG. 2 is a cross-sectional view in the direction of arrows A in FIG. 1.

A vacuum chamber 10, for use in processing the metal sheets for superplastic forming and diffusion bonding in the method described above is shown in FIGS. 1 and 2. The vacuum chamber 10 comprises a pressure vessel 12 which is designed for use with a range of pressures from a vacuum to atmospheric pressure. A pump 14 is connected to the interior of the vacuum chamber 10 via a pipe 16 in order to evacuate the vacuum chamber 10.

A first pressurisable assembly 18 and a second pressurisable assembly 28 are located in the vacuum chamber 10. The first pressurisable assembly 18 comprises a first rigid platen member 20 and a first resilient member 22 which define a first pressurisable chamber 24. The second pressurisable assembly 28 comprises a second rigid platen member 30 and a second resilient member 32 which define a second pressurisable chamber 34. The first rigid platen member 20 is provided in this example, with a number of parallel ribs 26 which extend into the first pressurised chamber 24 and which increase the rigidity of the first rigid platen member 20. The second rigid platen member 30 is also provided with a number of parallel ribs 36 which extend into the second pressurisable chambers 34 and which increase the rigidity of the second rigid platen member 30. If the platen members 20 and 30 are sufficiently rigid, the ribs may not be required.

The first and second rigid platen members, 20 and 30 respectively, are constructed to withstand the pressures achieved during the diffusion bonding step. The first and second rigid platen members 20 and 30 respectively are arranged to transmit the loads achieved during diffusion bonding to a restraining frame (not shown).

The first and second resilient members 22 and 32 respectively, are preferably thin membranes of metal which are coated to prevent adhesion to the sheets 50, 52 and 54 of the stack 48. The first and second resilient members 22 and 32 are preformed to fit, approximately, the exterior shape of the outer workpieces 50 and 54 of the stack 48.

The periphery of each of the first and second resilient members is arranged to overlap onto the solid, rigid, edges of the first and second rigid platen members respectively.

The first and second pressurisable assemblies 18 and 28 respectively are arranged so that the first and second resilient members 22 and 32 respectively are spaced from each other and confront each other. The stack 48, of sheets 50, 52 and 54 is locatable between the first and second resilient members 22 and 32 respectively.

Heating devices 46 are provided within the vacuum chamber 10 to heat the stack 48 of sheets 50, 52 and 54, before the sheets 50, 52 and 54 are diffusion bonded together, to evaporate the binder from the stop off applied to the surfaces of the sheets. The heating devices in this example are radiant heaters and reflectors, but other suitable heaters may be used.

A first pressurising pump 38 is connected to the first pressurisable chamber 24 via a pipe 40, and a second pressurising pump 42 is connected to the second pressurisable chamber 34 via a pipe 44. Alternatively a single pressurising pump may be connected to both first and second pressurisable chambers 24 and 34.

The first and second pressuring pumps 38 and 42 are arranged to reduce the pressure in, or evacuate, the first and second pressurisable chambers 24 and 34 respectively before the stack 48 is heated so that the edges of the sheets 50, 52 and 54 are not clamped together, to allow the volatile binder to be removed from between the sheets 50, 52 and 54.

The first and second pressurising pumps 38 and 42 are arranged to increase the pressure in the first and second pressurisable chambers 24 and 34 respectively during the diffusion bonding step so that the first and second resilient members 22 and 32 respectively exert the diffusion bonding pressure on the stack 48 of sheets 50, 52 and 54. The first and second resilient members 22 and 32 exert pressure across all the area of the stack 48 to be diffusion bonded.

The first and second pressurising pumps 38 and 42 are arranged to increase the pressure in the first and second pressurisable chambers 24 and 34 respectively so that a pressure of between 294 lbs per square inch and 441 lbs per square inch is exerted on the stack 48.

The first and second pressurisable assemblies 18 and 28 are designed such that the volumes of the first and second pressurisable chambers 24 and 34 respectively are minimised, so that the effects of any loss of pressure into the vacuum chamber 10 is minimised, there is a minimised possibility of rupturing the pressure vessel 12.

The use of the first and second pressurisable assemblies allows the diffusion bonding process to be carried out in a vacuum furnace which has a pressure vessel designed for use with a range of pressures from a vacuum to atmospheric pressure rather than a HIP furnace which has a pressure vessel designed for use with a range of pressures from a vacuum to 441 lbs per square inch or more. The vacuum chamber is of simpler construction because the requirement for an electron beam welding gun is obviated.

The method of diffusion bonding and superplastic forming described is best suited for the diffusion bonding of a flat stack of workpieces which are subsequently subjected to other processes, such as machining and/or twisting, before superplastic forming into the final form. The final form may be a finished article or some minor machining may be required to produce the finished article. The method provides a lower production cost method for diffusion bonding. It is also applicable to stacks of workpieces which have projections on the workpieces. In particular the first and second resilient members are preformed to fit, approximately, the exterior shape of the outer workpieces of the stack. For example the resilient members may be preformed to fit root shapes on the surface of the outer workpieces of the stack, which eventually form a fan blade. The resilient members may be preformed to fit clappers/snubbers preformed on the surface of the outer workpieces of the stack, which eventually form a fan blade.

Although the description has referred to titanium sheets or titanium workpieces the present invention is equally applicable to workpieces of other elementary metals, metal alloys and metal matrix composites which are diffusion bondable and one of the workpieces must be capable of superplastic extension. Aluminum and stainless steel are capable of superplastic extension at suitable temperatures and pressures.

The method is suitable for manufacturing heat exchangers, components for turbomachines, for example fan blades, fan duct outlet guide vanes etc.

Although the description has referred to a stack of three metal sheets it is possible to use stacks comprising two metal sheets or stacks comprising four or more metal sheets depending upon the particular article to be manufactured.

I claim:

1. A method of manufacturing an article by superplastic forming and diffusion bonding at least two metal workpieces comprising the steps of
   (a) applying a stop off material to prevent diffusion bonding to preselected areas of at least one of the surfaces of at least one of the at least two metal workpieces,
   (b) assembling the at least two workpieces into a stack relative to each other so that the surfaces are in mating abutment,
   (c) placing the stack in pressing means positioned within a vacuum chamber,
   (d) evacuating the vacuum chamber,
   (e) minimising the pressure applied across the thickness of the at least two workpieces, by the pressing means, to allow the flow of volatile binders and gases from between the at least two workpieces into the vacuum chamber,
   (f) heating the stack while it is within the vacuum chamber to evaporate volatile binder from the stop off material, while continuously evacuating the vacuum chamber to remove the volatile binder from between the at least two workpieces and the vacuum chamber,
   (g) applying heat and increasing the pressure applied across the thickness of the at least two workpieces, by the pressing means, to diffusion bond the at least two workpieces together in areas other than the preselected areas to form an integral structure,
   (h) removing the integral structure from the vacuum chamber,
   (i) heating the integral structure and internally pressurising it to cause the preselected areas of at least one of the workpieces to be superplastically formed to produce an article of pre-determined shape.

2. A method of manufacturing an article as claimed in claim 1 wherein the stack is placed between a first selective pressing means and a second selective pressing means in the vacuum chamber, the pressure applied across the thickness of the at least two workpieces is minimised by minimising the pressure applied by the first and second selective pressing means, the pressure applied across the thickness of the at least two workpieces is increased by increasing the pressure applied by the first and second selective pressing means.

3. A method of manufacturing an article as claimed in claim 2 wherein the first selective pressing means is a first selectively pressurisable chamber and the second selective pressing means is a second selectively pressurisable chamber.

4. A method of manufacturing an article as claimed in claim 1 wherein the stack is heated to a temperature between 250° C. and 350° to evaporate the volatile binder form the stop off material.

5. A method of manufacturing an article as claimed in claim 1 wherein the workpieces are made of a titanium alloy, the workpieces are heated to a temperature equal to or greater than 850° C. and the pressure applied is equal to or greater than $20 \times 10^5 Nm^{-2}$ to diffusion bond the workpieces together to form an integral structure.

6. A method of manufacturing an article as claimed in claim 5 wherein the workpieces are heated to a temperature between 900° C. and 950° C. and the pressure applied is between $20 \times 10^5 Nm^{-2}$ and $30 \times 10^5 Nm^{-2}$.

7. A method of manufacturing an article as claimed in claim 5 wherein the integral structure is heated to a temperature equal to or greater than 850° C. to superplastically form the integral structure.

8. A method of manufacturing an article as claimed in claim 7 wherein the integral structure is heated to a temperature between 900° C. and 950° C.

9. A method of manufacturing an article as claimed in claim 1 wherein during the assembling of the at least two workpieces into a stack a pipe is arranged to extend from the stack, one end of the pipe is adjacent a preselected area of at least one of the surfaces of at least one of the at least two metal workpieces.

10. A method of diffusion bonding together at least two metal workpieces comprising the steps of:
    (a) assembling the at least two metal workpieces into a stack relative to each other so that the surfaces of the metal workpieces are in mating abutment,
    (b) placing the stack between a first selectively pressurisable chamber and a second selectively pressurisable chamber disposed in a vacuum chamber,
    (c) evacuating the vacuum chamber,
    (d) applying heat and increasing the pressure in the first and second selectively pressurisable chambers simultaneously to apply a pressure across the thickness of the at least two workpieces, thereby diffusion bonding the workpieces together.

11. A method of diffusion bonding as claimed in claim 10 wherein, where the workpieces are made of titanium alloy, the workpieces are heated to a temperature equal to or greater than 850° C. and the pressure applied is equal to or greater than $20 \times 10^5 Nm^{-2}$ to diffusion bond the workpieces together to form an integral structure.

12. A method of diffusion bonding as claimed in claim 11 wherein the workpieces are heated to a temperature between 900° C. and 950° C. and the pressure applied is between $20 \times 10^5 Nm^{-2}$ and $30 \times 10^5 Nm^{-2}$.

* * * * *